(12) United States Patent
Kaita et al.

(10) Patent No.: US 9,266,978 B2
(45) Date of Patent: Feb. 23, 2016

(54) COPOLYMER AND METHOD OF MANUFACTURING THE SAME

(75) Inventors: Shojiro Kaita, Oizumi-machi (JP); Olivier Tardif, Wako (JP); Hideki Kitano, Yoshikawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/813,315

(22) PCT Filed: Jul. 22, 2011

(86) PCT No.: PCT/JP2011/004145
§ 371 (c)(1),
(2), (4) Date: Apr. 11, 2013

(87) PCT Pub. No.: WO2012/014421
PCT Pub. Date: Feb. 2, 2012

(65) Prior Publication Data
US 2013/0197174 A1   Aug. 1, 2013

(30) Foreign Application Priority Data
Jul. 30, 2010 (JP) ................................ 2010-172780

(51) Int. Cl.
*C08F 4/54* (2006.01)
*C08F 4/72* (2006.01)
*C08F 236/04* (2006.01)
*C08F 210/02* (2006.01)
*C08F 236/06* (2006.01)

(52) U.S. Cl.
CPC ................. *C08F 4/72* (2013.01); *C08F 210/02* (2013.01); *C08F 236/04* (2013.01); *C08F 236/06* (2013.01)

(58) Field of Classification Search
CPC .......... C08F 4/54; C08F 4/545; C08F 210/02; C08F 236/00; C08F 236/06
USPC ........................... 526/161, 172, 164, 335, 339
IPC ............... C08F 236/08, 236/06, 236/12, 236/18
See application file for complete search history.

(56) References Cited

U.S. PATENT DOCUMENTS

| 6,288,191 B1 * | 9/2001 | Nishiyama et al. ............ 526/339 |
| 6,383,971 B1 * | 5/2002 | Windisch ........................ 502/170 |
| 7,094,854 B2 * | 8/2006 | Monteil et al. ................. 526/339 |
| 7,612,009 B2 * | 11/2009 | Thiele ............................. 502/167 |
| 7,829,642 B2 * | 11/2010 | Hou et al. ....................... 526/164 |
| 2007/0276098 A1 * | 11/2007 | Luo ............................. 525/331.9 |
| 2009/0264604 A1 | 10/2009 | Kaita et al. |

FOREIGN PATENT DOCUMENTS

| CN | 1222532 A | 7/1999 | |
| CN | 1834121 A * | 9/2006 | ............. C08F 36/02 |
| FR | 2906534 A1 | 4/2008 | |
| JP | S58154705 A | 9/1983 | |
| JP | 2-61961 A | 3/1990 | |
| JP | 2005-15579 A | 1/2005 | |
| JP | 2005-015579 A * | 1/2005 | ............. C08F 4/603 |
| JP | 2006-503141 A | 1/2006 | |
| JP | 2008-222791 A | 9/2008 | |
| JP | 2008-280384 A | 11/2008 | |
| WO | 2004/076504 A2 | 9/2004 | |
| WO | WO 2007/105388 A1 * | 9/2007 | ............... C08F 4/54 |
| WO | 2007/129670 A1 | 11/2007 | |

OTHER PUBLICATIONS

Okuda et al. (JP 2005-015579 A) Jan. 20, 2005; abstract and translation in English.*
Kaulbach R.; Gebauer, U.; Gehrke, K.; Lechner, M.D.; Hummel, K. Die Angewandte Makromolekulare Chemie, 1995, 226, 101-109.*
Dong et al. (CN 1834121 A) Sep. 20, 2006; machine translation in English.*
Woodman et al. Macromolecules 2005, 38, 3060-3067.*
Xiaofang Li, et al., "Alternating and Random Copolymerization of Isoprene and Ethylene Catalyzed by Cationic Half-Sandwich Scandium Alkyls", Journal of the American Chemical Society, Sep. 30, 2009, pp. 13870-13882, vol. 131, No. 38.
Kaulbach R et al: "Copolymerisation Von Butadien Mit 1-Octen Und 1-Dodecen Mit Einem Neodymkatalysatorsystem", Angewandte Makromolekulare Chemie. Applied Macromolecularchemistry and Physics, Wiley VCH, Weinheim, DE, vol. 226, Mar. 1, 1995, pp. 101-109.

(Continued)

*Primary Examiner* — Rip A Lee
(74) *Attorney, Agent, or Firm* — Sughrue Mion, PLLC (57) ABSTRACT

Disclosed is a method of manufacturing a copolymer of a conjugated diene compound and an olefin other than the conjugated diene compound, where a conjugated diene compound and an olefin other than the conjugated diene compound is copolymerized in the presence of a polymerization catalyst composition containing components: (A) a rare earth element compound or a reactant of the rare earth element compound and a Lewis base; and (B) at least one selected from a group consisting of an ionic compound (B-1) composed of a non-coordinating anion and a cation, an aluminoxane (B-2), and at least one kind of halogen compound (B-3) selected from among a Lewis acid, a complex compound of a metal halide and a Lewis base, and an organic compound containing active halogen (when containing at least one of (B-1) and (B-3), the polymerization catalyst composition further contains component (C): an organometallic compound).

19 Claims, 2 Drawing Sheets

(56) References Cited

OTHER PUBLICATIONS

Communication dated May 13, 2014, issued by the European Patent Office in corresponding European application No. 11812023.7.
Communication dated Sep. 23, 2014, issued by the State Intellectual Property Office of P.R. China in counterpart Chinese Application No. 201180047518.5.
Communication dated Apr. 10, 2015, issued by the State Intellectual Property Office of P.R. China in corresponding Chinese Application No. 201180047518.5.
Woodman et al. "Heterogenized 'Ligand-Free' Lanthanide Catalysts for the Homo- and Copolymerization of Ethylene and 1,3-Butadiene", Macromolecules, Apr. 19, 2005, 38(8), pp. 3060-3067.
Communication dated Dec. 2, 2014 from the Japanese Patent Office in Japanese Application No. 2012-526299.
Communication dated Feb. 10, 2015, issued by the Japanese Patent Office in corresponding Japanese Application No. 2012-526299.
Communication dated Oct. 9, 2015 from the State Intellectual Property Office of the People's Republic of China in corresponding Chinese Application No. 201180047518.5.

* cited by examiner

FIG. 1

COPOLYMER AND METHOD OF MANUFACTURING THE SAME

CROSS REFERENCE TO RELATED APPLICATIONS

This application is a National Stage of International Application No. PCT/JP2011/004145 filed Jul. 22, 2011, claiming priority based on Japanese Patent Application No. 2010-172780 filed Jul. 30, 2010, the contents of all of which are incorporated herein by reference in their entirety.

TECHNICAL FIELD

The present invention relates to a copolymer and a method of manufacturing the copolymer, and in particular, to a method of manufacturing a copolymer a conjugated diene compound and an olefin other than the conjugated diene compound using a novel polymerization catalyst composition containing a rare earth element compound or a reactant of the rare earth element compound and a Lewis base.

BACKGROUND ART

It is well known that coordination anionic polymerization using catalyst systems represented by a Ziegler-Natta catalyst allows for homopolymerization of olefins and dienes. However, it was difficult to provide efficient copolymerization of olefins and dienes using such catalyst systems. For example, while JP 2006-503141 A (PTL 1) and JP 2-061961 A (PTL 2) refer to copolymerization of ethylenes and dienes, there were many problems associated with the use of a special organic metal complex as a catalytic component, limited structures of the obtained polymer, low catalytic activity, low molecular weight of the generated polymer, and so on.

CITATION LIST

Patent Literature

PTL 1: JP 2006-503141 A
PTL 2: JP 2-061961 A

SUMMARY OF INVENTION

Technical Problem

Therefore, an object of the present invention is to provide a method of manufacturing a copolymer of a conjugated diene compound and an olefin other than the conjugated diene compound using a novel polymerization catalyst composition containing a rare earth element compound or a reactant of the rare earth element compound and a Lewis base. In addition, another object of the present invention is to provide a copolymer obtained by such a production method.

Solution to Problem

As a result of keen study for solving the aforementioned problems, the inventors have found the following, and achieved the present invention. That is, a conjugated diene compound and an olefin other than the conjugated diene compound is polymerized in the presence of a polymerization catalyst composition, which is obtained by combining a rare earth element compound or a reactant of the rare earth element compound and a Lewis base (component A) with a particular compound of cation-generating type (component B), or with the compound (component B) and a particular organometallic compound (component C), whereby a copolymer composed of these monomers may be obtained.

That is, a method of manufacturing a copolymer according to the present invention comprises copolymerizing a conjugated diene compound and an olefin other than the conjugated diene compound in the presence of a polymerization catalyst composition, the polymerization catalyst composition containing:

component (A): a rare earth element compound or a reactant of the rare earth element compound and a Lewis base, with no bond formed between the rare earth element and carbon; and component (B): at least one selected from a group consisting of an ionic compound (B-1) composed of a non-coordinating anion and a cation, an aluminoxane (B-2), and at least one kind of halogen compound (B-3) selected from among a Lewis acid, a complex compound of a metal halide and a Lewis base, and an organic compound containing active halogen, and when the polymerization catalyst composition contains at least one of the ionic compound (B-1) and the halogen compound (B-3), the polymerization catalyst composition further containing:

component (C): an organic metal compound represented by the following general formula (i):

$$YR^1{}_aR^2{}_bR^3{}_c \qquad (i),$$

where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table.

In a preferred embodiment of the method of manufacturing the copolymer of the present invention, when the polymerization catalyst composition contains the aluminoxane (B-2), the polymerization catalyst composition further containing:

component (C): an organic metal compound represented by the following general formula (i):

$$YR^1{}_aR^2{}_bR^3{}_c \qquad (i),$$

where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 or Group 12 of the periodic table, a, b, and c are all 1 when Y is a metal selected from Group 13 of the periodic table.

In another preferred embodiment of the method of manufacturing the copolymer of the present invention, the organic metal compound as the component (C) is an organic aluminum compound represented by the following general formula (I):

$$AlR^1R^2R^3 \qquad (I),$$

where $R^1$ and $R^2$ are the same or different hydrocarbon groups each having 1 to 10 carbon atoms or a hydrogen atom, and $R^3$ is a hydrocarbon group having 1 to 10 carbon atoms, in which $R^3$ may be the same as or different from $R^1$ or $R^2$ above.

In still another preferred embodiment of the method of manufacturing the copolymer of the present invention, as the component (A), a rare earth element compound or a reactant of the rare earth element compound and a Lewis base is represented by the following general formula (II) or (III):

$$MX_2 \cdot Lw \quad (II)$$

$$MX_3 \cdot Lw \quad (III),$$

where M represents a lanthanoid element, scandium, or yttrium; X each independently represents a hydrogen atom, a halogen atom, an alkoxy group, a thiolate group, an amide group, a silyl group, an aldehyde residue, a ketone residue, a carboxylic acid residue, a thiocarboxylic acid residue, or a phosphorous compound residue; L represents a Lewis base; and w represents 0 to 3.

In still another preferred embodiment of the method of manufacturing the copolymer of the present invention, the olefin other than the conjugated diene compound is a non-conjugated olefin.

In still another preferred embodiment of the method of manufacturing the copolymer of the present invention, the olefin other than the conjugated diene compound is an acyclic olefin.

In still another preferred embodiment of the method of manufacturing the copolymer of the present invention, the olefin other than the conjugated diene compound is an α olefin.

In still another preferred embodiment of the method of manufacturing the copolymer of the present invention, the olefin other than the conjugated diene compound has 2 to 8 carbon atoms.

In still another preferred embodiment of the method of manufacturing the copolymer of the present invention, the olefin other than the conjugated diene compound is at least one selected from a group consisting of ethylene, propylene, butene, pentene, hexene, heptene, and octene.

In still another preferred embodiment of the method of manufacturing the copolymer of the present invention, the conjugated diene compound has 4 to 8 carbon atoms.

In still another preferred embodiment of the method of manufacturing the copolymer of the present invention, the conjugated diene compound is 1,3-butadiene or isoprene.

In addition, the copolymer of the present invention is obtained by the above-described methods.

Preferably, the copolymer of the present invention has a weight-average molecular weight of 50,000 or more.

Preferably, the conjugated diene compound unit has a cis-1,4 bond content of 55% or more.

Advantageous Effect of Invention

According to the present invention, a conjugated diene compound and an olefin other than the conjugated diene compound is polymerized in the presence of a polymerization catalyst composition, which is obtained by combining a rare earth element compound or a reactant of the rare earth element compound and a Lewis base (component A) with a particular compound of cation-generating type (component B), or with the compound (component B) and a particular organometallic compound (component C), whereby a copolymer composed of these monomers can be produced.

BRIEF DESCRIPTION OF DRAWINGS

The present invention will be further described below with reference to the accompanying drawings, wherein.

DESCRIPTION OF EMBODIMENTS

The present invention will be described in detail below. A method of manufacturing a copolymer according to the present invention comprises copolymerizing a conjugated diene compound and an olefin other than the conjugated diene compound in the presence of a polymerization catalyst composition, the polymerization catalyst composition containing:

component (A): a rare earth element compound or a reactant of the rare earth element compound and a Lewis base, with no bond formed between the rare earth element and carbon; and component (B): at least one selected from a group consisting of an ionic compound (B-1) composed of a non-coordinating anion and a cation, an aluminoxane (B-2), and at least one kind of halogen compound (B-3) selected from among a Lewis acid, a complex compound of a metal halide and a Lewis base, and an organic compound containing active halogen, and when the polymerization catalyst composition contains at least one of the ionic compound (B-1) and the halogen compound (B-3), the polymerization catalyst composition further containing:

component (C): an organic metal compound represented by the following general formula (i):

$$YR^1_a R^2_b R^3_c \quad (i),$$

where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table.

As described above, it was difficult to provide efficient copolymerization of olefins and dienes using conventional coordination polymerization catalysts. Accordingly, the inventors of the present invention have found that in a catalyst system for use in coordination anionic polymerization, an olefin other than a conjugated diene compound may be introduced to the polymerization reaction of the conjugated diene compound in an efficient manner by optimizing a polymerization catalyst composition, which contains a rare earth element compound or a reactant of the rare earth element compound and a Lewis base. In addition, the copolymer of a conjugated diene compound and an olefin other than the conjugated diene compound that is obtained by using such a catalyst system has a high cis-1,4 bond content in the microstructure of the conjugated diene compound unit. Thus, the glass transition temperature (Tg) is kept at a low level, and therefor, abrasion resistance may be improved by the copolymer, which is preferably used as a rubber component in a rubber composition.

The copolymer of a conjugated diene compound and an olefin other than the conjugated diene compound obtained by the method of manufacturing a copolymer according to the present invention has no particular limitation, except for the use of a polymerization catalyst composition, which will be described in detail below. For example, as is the case with conventional methods of manufacturing polymers using normal coordinated ionic polymerization catalysts, the copolymer of the present invention may be obtained by copolymerization of a mixture of monomers, i.e., a conjugated diene compound and an olefin other than the conjugated diene compound. In addition, in the method of manufacturing the copolymer of the present invention, the polymerization of a conjugated diene compound and an olefin other than the conjugated diene compound is preferably addition polymerization. It should be noted that any polymerization method may be used, including solution polymerization, suspension polymerization, liquid phase bulk polymerization, emulsion polymerization, gas phase polymerization, solid phase polymerization, and so on. In addition, in the case of using a solvent for polymerization reaction, any solvent may be used that is inert to the polymerization reaction. While the amount of the solvent used is arbitrary, it is preferably such that the concentration of the component (A) contained in the polymerization catalyst composition is 0.1 mol/L to 0.0001 mol/L.

The conjugated diene compound used as a monomer preferably has 4 to 8 carbon atoms, more preferably 4 to 6 carbon atoms, still more preferably 4 to 5 carbon atoms. Examples of the conjugated diene compound include 1,3-butadiene, isoprene, 1,3-pentadiene, 2,3-dimethylbutadiene, and so on; among these, preferred are 1,3-butadiene and isoprene. In addition, these conjugated diene compounds may be used alone or in a combination of two or more.

On the other hand, any olefin may be used as a monomer as long as it is an olefin exclusive of the above-described conjugated diene compound. However, such an olefin other than the conjugated diene compound is preferably an acyclic olefin, non-conjugated olefin, and furthermore, α-olefin, in terms of the possibility of offering excellent heat resistance as well as a higher freedom degree of design as an elastomer by reducing the proportion of double bonds in the main chain of the copolymer and decreasing the crystallization ability. Moreover, the olefin other than the conjugated diene compound preferably has 2 to 8 carbon atoms, and specific examples of the olefin other than the conjugated diene compound include ethylene, propylene, butene, pentene, hexene, heptene, octene, and so on. In addition, these olefins other than the conjugated diene compound may be used alone or in a combination of two or more.

The polymerization catalyst composition for use in the method of manufacturing the copolymer of the present invention should contain the above-described components (A) and (B). In this case, when the polymerization catalyst composition contains at least one kind of the ionic compound (B-1) and the halogen compound (B-3), the polymerization catalyst composition should further contain:

component (C): an organic metal compound represented by the following general formula (i):

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table). The ionic compound (B-1) and the halogen compound (B-3) do not have carbon atoms to be fed to the component (A), and thus the component (C) becomes necessary as a source of feeding carbon to the component (A). Here, the polymerization catalyst composition still may include the component (C) even if the polymerization catalyst composition includes the aluminoxane (B-2). Further, the polymerization catalyst composition may further include another component such as a co-catalyst, which is contained in a general rare earth element compound-based polymerization catalyst composition.

The component (A) contained in the polymerization catalyst composition is a rare earth element compound or a reactant of the rare earth element compound and a Lewis base. Here, a rare earth element compound or a reactant of the rare earth element compound and a Lewis base do not have a direct bond of the rare earth element and carbon. When the rare earth element compound or a reactant thereof does not have a direct bond of a rare earth element and carbon, the resulting compound is stable and easy to handle. Here, the rare earth element compound refers to a compound containing a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbio, tulio, itterbio, and lutezio. These components (A) may be contained alone or in combination of two or more.

The rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (II) or (III):

(where: M represents a lanthanoid element, scandium, or yttrium; X each independently represent a hydrogen atom, a halogen atom, an alkoxy group, a thiolate group, an amide group, a silyl group, an aldehyde residue, a ketone residue, a carboxylic acid residue, a thiocarboxylic acid residue, or a phosphorous compound residue; L represents a Lewis base; and w represents 0 to 3).

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; aromatic alkoxy groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bis-trialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thiocarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid (butyl)(2-ethylhexyl), a phosphoric acid (1-methylheptyl)(2-ethylhexyl), and a phosphoric acid (2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, a and phosphonic acid mono-p-nonylphenyl; residues of phosphinic acid such as a dibutylphosphinic acid, a bis(2-ethylhexyl)phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl)phosphinic acid, (2-ethylhexyl)(2-methylhexyl)(1-methylheptyl)phosphinic acid, an (2-ethylhexyl)(p-nonylphenyl)phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more. Of those, amide groups are preferred because the amide groups easily form active species through reaction with co-catalyst.

As to the component (A) used in the polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in Formulae (II) and (III)), the Lewis base L in each Formula may be the same as or different from each other.

The component (B) contained in the polymerization catalyst composition is at least one compound selected from a group consisting of: an ionic compound (B-1); an aluminoxane (B-2); and a halogen compound (B-3). The total content of the component (B) contained in the polymerization catalyst composition is preferably defined to fall within a range of 0.1-fold mol to 50-fold mol, with respect to the component (A).

The ionic compound represented by (B-1) is formed of non-coordinating anion and cation, and an example thereof includes: an ionic compound that reacts with the rare earth element compound as the component (A) or with the reactant resulting from Lewis base and the rare earth element compound, so as to form a cationic transition metal compound. Here, examples of the non-coordinating anion include: tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (tripheyl, pentafluorophenyl)borate, [tris(pentafluorophenyl), phenyl]borate, and tridecahydride-7,8-dicarbaundecaborate.

Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl)carbonium cation include a tri(methylphenyl)carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation. Therefore, the ionic compound may preferably be a compound obtained by combining any one selected from the non-coordinating anions described above and any one selected from the cations described above. Specific examples thereof preferably include an N,N-dimethylanilinium tetrakis(pentafluorophenyl)borate and a triphenylcarbonium tetrakis(pentafluorophenyl)borate. These ionic compounds may be contained alone or in combination of two or more. The content of the ionic compound in the polymerization catalyst composition is preferably 0.1-fold mol to 10-fold mol, and more preferably about 1-fold mol, with respect to the component (A).

The aluminoxane represented by (B-2) is a compound obtained by contacting an organic aluminum compound with a condensation agent, and examples thereof include: a chain type aluminoxane or a cyclic aluminoxane, both having a repeating unit represented by the general formula (—Al(R')O—) (where R' is a hydrocarbon group having 1 to 10 carbon atoms and may be partly substituted with halogen atom and/ or alkoxy group, and the polymerization degree of the repeating unit is preferably at least 5, more preferably at least 10). Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained using, as a raw material, a mixture of trimethyl aluminum and tributyl aluminum can be suitably used. The content of aluminoxane in the polymerization catalyst composition is preferably about 10 to 1,000 at an element ratio (Al/M) of the aluminum element Al of the aluminoxane to the rare earth element M forming the component (A).

The halogen compound represented by (B-3) includes at least one of: a Lewis acid; a complex compound of a metal halide and a Lewis base; and an organic compound containing active halogen, and is capable of reacting with, for example, the rare earth element compound as the component (A) or with the reactant resulting from Lewis base and the rare earth element compound, so as to form a compound, such as a halogenated transition metal compound or a compound with a charge-deficient transition metal center. The content of the halogen compound in the polymerization catalyst composition is preferably 1-fold mol to 5-fold mol, with respect to the component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride, with the diethyl aluminum chloride, the ethyl aluminum sesquichloride, the ethyl aluminum dichloride, the diethyl aluminum bromide, the ethyl aluminum sesquibromide, and the ethyl aluminum dibromide being particularly preferred.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper bromide; a copper iodide; a silver chloride; a silver bromide; a silver iodide; a gold chloride; a gold iodide; and a gold bromide, with the magnesium chloride, the calcium chloride, the barium chloride, the manganese chloride, the zinc chloride, and the copper chloride being preferred, and the magnesium chloride, the manganese chloride, the zinc chloride, and the copper chloride being particularly preferred.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol, with the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol being preferred.

The Lewis base is subjected to reaction with the metal halide in the proportion of 0.01 mol to 30 mol, preferably 0.5 mol to 10 mol, per 1 mol of the metal halide. The use of the reactant obtained from the reaction of the Lewis base can reduce residual metal in the polymer.

An example of the organic compound containing active halogen includes benzyl chloride.

The component (C) contained in the polymerization catalyst composition is an organic compound represented by the general formula (i):

$$YR^1_a R^2_b R^3_c \quad (i)$$

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 or Group 12 of the periodic table, a, b, and c are all 1 when Y is a metal selected from Group 13 of the periodic table), and is preferably an organic aluminum compound represented by the general formula (I):

$$AlR^1 R^2 R^3 \quad (I)$$

(where $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above). Examples of the organic aluminum compound in the formula (I) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The organic metal compounds as the component (C) may be contained alone or in combination of two or more. The content of the organic aluminum compound in the polymerization catalyst composition is preferably 1-fold mol to 50-fold mol.

The method of manufacturing the copolymer of the present invention may be carried out similarly to a conventional method of manufacturing a copolymer through polymerization reaction using the coordination ion polymerization catalyst, as mentioned earlier, except that the above-described polymerization catalyst composition is used as a polymerization catalyst. Here, the method of manufacturing the copolymer of the present invention can be performed in either one of the following manners. That is, for example, (1) the components forming the polymerization catalyst composition may be separately provided in the polymerization reaction system including, as monomers, a conjugated diene compound and an olefin other than the conjugated diene, to thereby produce the polymerization catalyst composition in the reaction system, or (2) the polymerization catalyst composition prepared in advance may be provided into the polymerization reaction system. The amount of the component (A) to be contained in the polymerization catalyst composition is preferably set to fall within a range of 0.0001-fold mol to 0.01-fold mol with respect to the total amount of the conjugated diene compound and the olefin other than the conjugated diene compound.

Further, the polymerization reaction may preferably be performed in an inert gas atmosphere, and preferably in nitrogen or argon atmosphere.

The polymerization temperature of the polymerization reaction is not particularly limited, and preferably in a range of, for example, −100° C. to 200° C., and may also be set to temperatures around room temperature. An increase in polymerization temperature may reduce the cis-1,4-selectivity in the polymerization reaction. On the other hand, the reaction time of the polymerization reaction is not particularly limited, and may preferably be in a range of, for example, 1 second to 10 days, which may be selected as appropriate depending on the conditions such as the type of the monomers to be polymerized, the type of the catalyst, and the polymerization temperature.

The copolymer of a conjugated diene compound and an olefin other than the conjugated diene compound obtained by the method of manufacturing the copolymer of the present invention is not limited to any particular weight-average molecular weight (Mw). However, from the viewpoint of application to materials with polymeric structure, this copolymer preferably has a weight-average molecular weight (Mw) of 10,000 or more, more preferably 50,000 or more, still more preferably 50,000 to 600,000. It should be noted here that the weight-average molecular weight (Mw) may be obtained through gel permeation chromatography (GPC) using polystyrene as a reference.

The copolymer of a conjugated diene compound and an olefin other than the conjugated diene compound obtained by the method of manufacturing the copolymer according to the present invention has a high cis-1,4 bond content in the conjugated diene compound unit thereof. In this case, the above-described conjugated diene compound unit preferably has a cis-1,4 bond content of 55% or more. When the conjugated diene compound unit has a cis-1,4 bond content of 55% or more, it is possible to maintain a low glass transition point (Tg), thereby improving physical properties, such as abrasion resistance. On the other hand, when the conjugated diene compound unit has a cis-1,4 bond content of less than 55%, the glass transition point (Tg) becomes higher, which may result in a reduction in durability, such as abrasion resistance.

The copolymer of a conjugated diene compound and an olefin other than the conjugated diene compound obtained by the method of manufacturing the copolymer according to the present invention preferably contains 3 mol % to 98 mol %, more preferably 10 mol % to 90 mol %, of the olefin other than the conjugated diene compound. When the content of the olefin other than the conjugated diene compound is within the above-specified range, such an advantage is preserved that is obtained by introducing the olefin having an effect of improving heat resistance and uniformly acting as an elastomer into the main chain. If the content of the olefin other than the conjugated diene compound is below 3 mol %, the advantage obtained by introducing the olefin into the main chain may be lost, whereas above 98 mol %, the advantage obtained by introducing the conjugated diene compound into the main chain (e.g., cross-linkability) may be lost.

The copolymer of a conjugated diene compound and an olefin other than the conjugated diene compound obtained by the method of manufacturing the copolymer of the present invention may be generally used for elastomer products, particularly tire members, because of its advantageous use in crosslinking while maintaining crystallinity.

EXAMPLES

In the following, the invention of the present invention is described with reference to Examples. However, the present invention is no way limited to the following Examples.

Example 1

Firstly, 300 mL of a toluene solution containing 18.20 g (0.34 mol) of 1,3 butadiene was added to a 400 mL pressure-resistant grass reactor that had been sufficiently dried, and then ethylene was introduced thereto at 0.8 MPa. Meanwhile, in a glovebox under a nitrogen atmosphere, 34.0 μmol of trisbistrimethylsilylamide gadolinium [$Gd(N(SiMe_3)_2)_3$], 41 μmol of N,N-dimethylanilinium tetrakis(pentafluorophenyl)borate [$Me_2NHPhB(C_6F_5)_4$], and 1.19 mmol of triisobutylaluminum were provided in a glass container, which was dissolved into 8 mL of toluene, to thereby obtain a catalyst solution. After that, the catalyst solution was taken out from the glovebox and added by 33.7 μmol of gadolinium equivalent to the monomer solution, which was then subjected to polymerization at room temperature for 180 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer A. The yield of the copolymer A thus obtained was 29.50 g.

Example 2

Polymerization was performed in the same way as that performed in Example 1, except that 4.55 g (0.084 mol) of 1,3-butadiene was used, to obtain a copolymer B. The yield of the copolymer B thus obtained was 22.50 g.

Example 3

Firstly, 300 mL of a toluene solution containing 23.76 g (0.44 mol) of 1,3 butadiene was added to a 400 mL pressure-resistant grass reactor that had been sufficiently dried, and then ethylene was introduced thereto at 0.8 MPa. Meanwhile, in a glovebox under a nitrogen atmosphere, 50 μmol of Gd(N(SiMe$_3$)$_2$)$_3$, 60 μmol of Me$_2$NHPhB(C$_6$F$_5$)$_4$, and 1.50 mmol of diisobutylaluminum hydride were provided in a glass container, which was dissolved into 8 mL of toluene, to thereby obtain a catalyst solution. After that, the catalyst solution was taken out from the glovebox and added by 44 μmol of gadolinium equivalent to the monomer solution, which was then subjected to polymerization at 40° C. for 180 minutes. After the polymerization, 1 mL of an isopropanol solution containing, by 5 mass %, NS-5 was added to stop the reaction. Then, a large amount of methanol was further added to isolate the copolymer, and the copolymer was vacuum dried at 70° C. to obtain a copolymer C. The yield of the copolymer C thus obtained was 19.50 g.

Example 4

Firstly, 300 mL of a toluene solution containing 23.76 g (0.44 mol) of 1,3 butadiene was added to a 400 mL pressure-resistant grass reactor that had been sufficiently dried, and then ethylene was introduced thereto at 0.8 MPa. Meanwhile, in a glovebox under a nitrogen atmosphere, 500 μmol of Gd(N(SiMe$_3$)$_2$)$_3$, 15.0 mmol of aluminum equivalent of a methylaluminoxane-based co-catalyst (TMAO-212 manufactured by Tosoh Finechem Corporation), and 10.0 mmol of diisobutylaluminum hydride were provided in a glass container, which was dissolved into 25 mL of toluene, to thereby obtain a catalyst solution. After that, the catalyst solution was taken out from the glovebox and added by 440 μmol of gadolinium equivalent to the monomer solution, which was then subjected to polymerization at room temperature for 180 minutes. After the polymerization, 1 mL of an isopropanol solution containing, by 5 mass %, NS-5, was added to stop the reaction. Then, a large amount of methanol was further added to isolate the copolymer, and the copolymer was vacuum dried at 70° C. to obtain a copolymer D. The yield of the copolymer D thus obtained was 29.15 g.

Example 5

Firstly, 300 mL of a toluene solution containing 23.76 g (0.44 mol) of 1,3-butadiene was added to a 400 mL pressure-resistant grass reactor that had been sufficiently dried, and then ethylene was introduced thereto at 0.8 MPa. Meanwhile, in a glovebox under a nitrogen atmosphere, 500 μmol of trisbistrimethylsilylamide neodymium [Nd(N(SiMe$_3$)$_2$)$_3$], 600 μmol of Me$_2$NHPhB(C$_6$F$_5$)$_4$, and 10.0 mmol of diisobutylaluminum hydride were provided in a glass container, which was dissolved into 25 mL of toluene, to thereby obtain a catalyst solution. After that, the catalyst solution was taken out from the glovebox and added by 440 μmol of neodymium equivalent to the monomer solution, which was then subjected to polymerization at room temperature for 180 minutes.
After the polymerization, 1 mL of an isopropanol solution containing, by 5 mass %, NS-5, was added to stop the reaction. Then, a large amount of methanol was further added to isolate the copolymer, and the copolymer was vacuum dried at 70° C. to obtain a copolymer E. The yield of the copolymer E thus obtained was 35.50 g.

Example 6

Polymerization was performed in the same way as that performed in Example 5, except that tris[bis(dimethylsilyl) amide]scandium [Sc(N(SiHMe$_2$)$_2$)$_3$.(THF)$_2$] was used instead of Nd(N(SiMe$_3$)$_2$)$_3$, to obtain a copolymer F. The yield of the copolymer F thus obtained was 37.40 g.

Comparative Example 1

Polymerization was performed in the same way as that performed in Example 1 except that Me$_2$NHPhB(C$_6$F$_5$)$_4$ was not used. As a result, the polymerization failed to proceed to generate a polymer.

Figure 1:
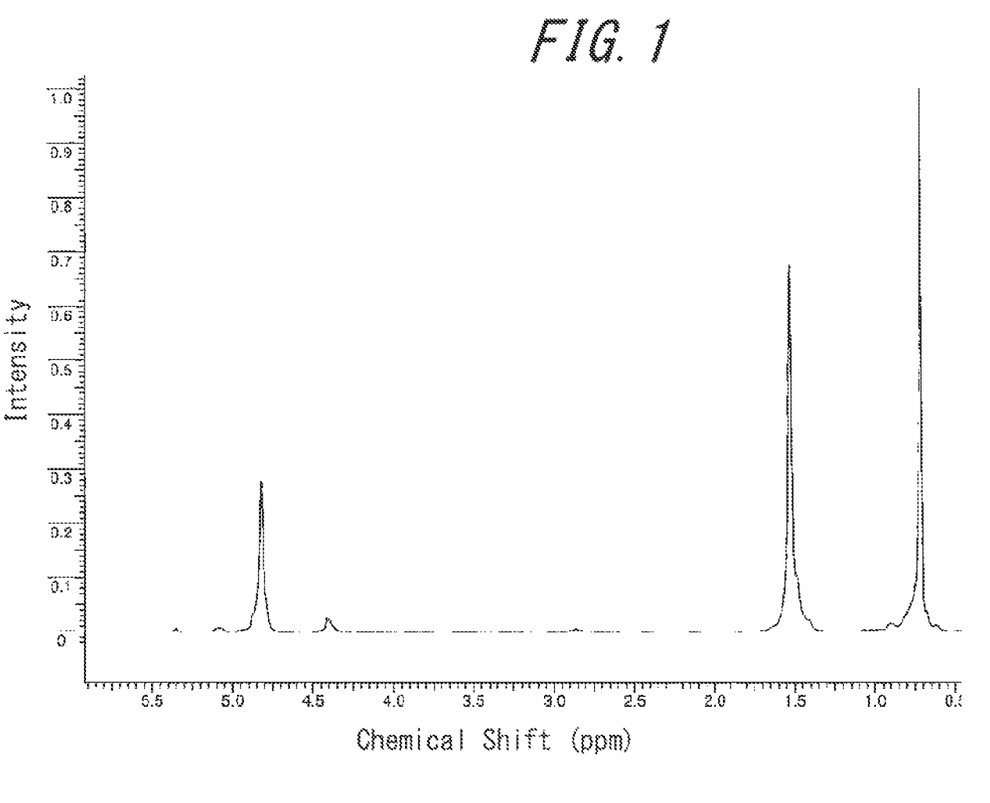
FIG. 1 is a $^{1H}$-NMR spectrum chart of a butadiene-ethylene copolymer A.
Figure 2:
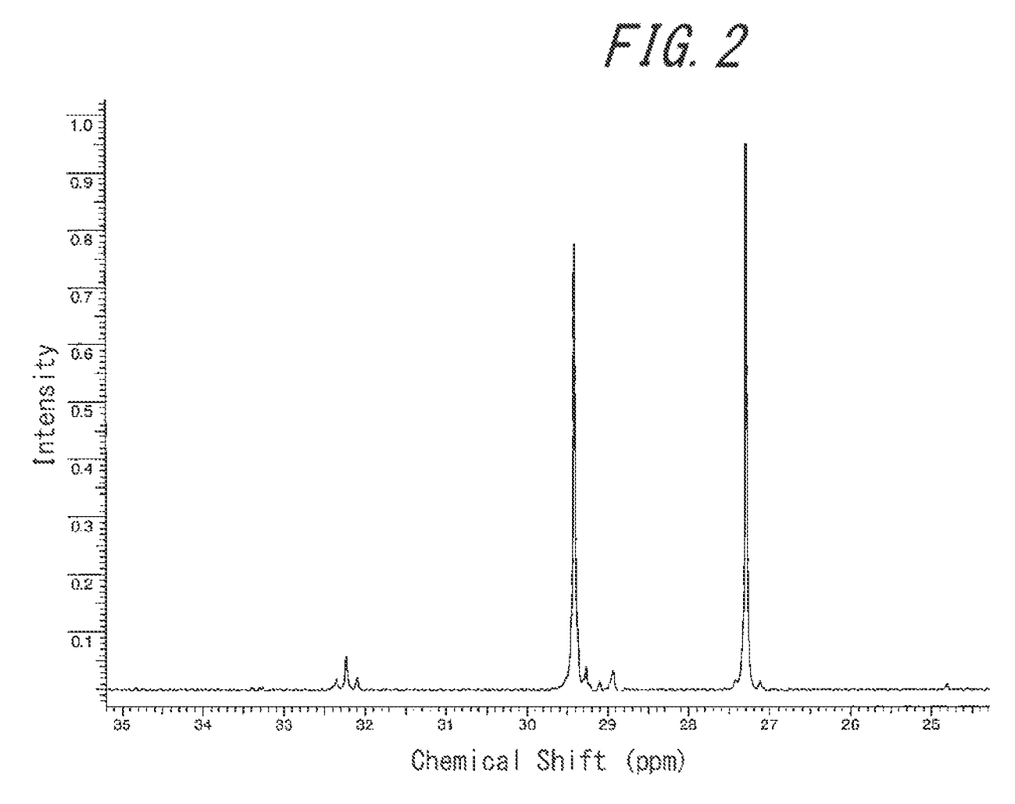
FIG. 2 is a $^{13}C$-NMR spectrum chart of a butadiene-ethylene copolymer A.

The copolymers A to F of Examples 1 to 6 produced as described above were each subjected to measurement and evaluation by the following method so as to investigate the microstructure, the ethylene content, the weight-average molecular weight (Mw), and the molecular weight distribution (Mw/Mn). FIG. 1 is a $^1H$-NMR spectrum chart of a butadiene-ethylene copolymer A, and FIG. 2 is a $^{13}C$-NMR spectrum chart of a butadiene-ethylene copolymer A. The NMR was measured using deuterated 1,1,2,2-tetrachloroethane as a solvent at 100° C.

(1) Microstructure

The microstructure of the butadiene unit in the copolymer is determined from an integral ratio based on $^1H$-NMR spectrum (1,2-vinyl bond content) and $^{13}C$-NMR spectrum (a ratio of cis-1,4 bond content to trans-1,4 bond content). The calculated values of the cis-1,4 bond content (%) are shown in Table 1.

(2) Ethylene Content

The content (mol %) of the ethylene unit in the copolymer is determined from an integral ratio based on $^1H$-NMR spectrum and $^{13}C$-NMR spectrum.

(3) Weight-Average Molecular Weight (Mw) and Molecular Weight
Distribution (Mw/Mn)

A polystyrene equivalent weight-average molecular weight (MW) and a molecular weight distribution (Mw/Mn) of each copolymer were obtained through gel permeation chromatography [GPC: HLC-8121GPC/HT (manufactured by Tosoh Corporation), column: two of GMH$_{HR}$-H(S)HT (manufactured by Tosoh Corporation), detector: a differential refractometer (RI)], using monodisperse polystyrene as a reference. The measurement temperature was 140° C.

TABLE 1

| | Example 1 | Example 2 | Example 3 | Example 4 | Example 5 | Example 6 |
|---|---|---|---|---|---|---|
| copolymer type | A | B | C | D | E | F |
| Mw (× 10$^3$) | 87 | 66 | 505 | 142 | 114 | 58 |
| Mw/Mn | 5.8 | 4.9 | 7.0 | 38.4 | 16.4 | 15.8 |
| cis-1,4 bond content (%) | 85 | 65 | 92 | 92 | 58 | 80 |
| ethylene content (mol %) | 50 | 90 | 48 | 17 | 54 | 45 |

INDUSTRIAL APPLICABILITY

The present invention may provide a method of manufacturing a copolymer of a conjugated diene compound and an olefin other than the conjugated diene compound using a novel polymerization catalyst composition containing a rare earth element compound or a reactant of the rare earth element compound and a Lewis base, and a copolymer obtained by such a production method.

The invention claimed is:
1. A method of manufacturing a copolymer, the method comprising copolymerizing a conjugated diene compound and an olefin other than the conjugated diene compound in the presence of a polymerization catalyst composition, the polymerization catalyst composition containing:

component (A): a rare earth element compound or a reactant of the rare earth element compound and a Lewis base, with no bond formed between the rare earth element and carbon; and component (B): an aluminoxane (B-2), wherein as the component (A), the rare earth element compound or the reactant of the rare earth element compound and the Lewis base is represented by the following general formula (III):

$$MX_3 \cdot Lw \qquad (III),$$

where M represents a lanthanoid element, scandium, or yttrium; X each independently represents a bistrialkylsilyl amide group; L represents a Lewis base; and w represents 0 to 3.

2. The method of manufacturing the copolymer according to claim 1, wherein the polymerization catalyst composition further contains:

component (C): an organic metal compound represented by the following general formula (i):

$$YR^1_a R^2_b R^3_c \qquad (i),$$

where Y is a metal selected from Group 1, Group 2, Group 12, or Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 or Group 12 of the periodic table, a, b, and c are all 1 when Y is a metal selected from Group 13 of the periodic table.

3. The method of manufacturing the copolymer according to claim 2, wherein the organic metal compound as the component (C) is an organic aluminum compound represented by the following general formula (I):

$$AlR^1R^2R^3 \qquad (I),$$

where $R^1$ and $R^2$ are the same or different hydrocarbon groups each having 1 to 10 carbon atoms or a hydrogen atom, and $R^3$ is a hydrocarbon group having 1 to 10 carbon atoms, in which $R^3$ may be the same as or different from $R^1$ or $R^2$ above.

4. The method of manufacturing the copolymer according to claim 1, wherein the olefin other than the conjugated diene compound is a non-conjugated olefin.

5. The method of manufacturing the copolymer according to claim 4, wherein the olefin other than the conjugated diene compound has 2 to 8 carbon atoms.

6. The method of manufacturing the copolymer according to claim 5, wherein the olefin other than the conjugated diene compound is at least one selected from the group consisting of ethylene, propylene, butene, pentene, hexene, heptene, and octene.

7. The method of manufacturing the copolymer according to claim 1, wherein the olefin other than the conjugated diene compound is an acyclic olefin.

8. The method of manufacturing the copolymer according to claim 1, wherein the olefin other than the conjugated diene compound is an α-olefin.

9. The method of manufacturing the copolymer according to claim 1, wherein the conjugated diene compound has 4 to 8 carbon atoms.

10. The method of manufacturing the copolymer according to claim 9, wherein the conjugated diene compound is 1,3-butadiene or isoprene.

11. A method of manufacturing a copolymer, the method comprising copolymerizing a conjugated diene compound and an olefin other than the conjugated diene compound in the presence of a polymerization catalyst composition, the polymerization catalyst composition containing:

component (A): a rare earth element compound or a reactant of the rare earth element compound and a Lewis base, with no bond formed between the rare earth element and carbon;

component (B): at least one selected from the group consisting of an ionic compound (B-1) composed of a non-coordinating anion and a cation, and at least one kind of halogen compound (B-3) selected from among a Lewis acid, a complex compound of a metal halide and a Lewis base, or an organic compound containing active halogen; and component (C): an organic metal compound represented by the following general formula (i):

$$YR^1_a R^2_b R^3_c \qquad (i),$$

where Y is a metal selected from Group 1, Group 2, Group 12, or Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table, wherein as the component (A), the rare earth element compound or the reactant of the rare earth element compound and the Lewis base is represented by the following general formula (III):

$$MX_3 \cdot Lw \qquad (III),$$

where M represents a lanthanoid element, scandium, or yttrium; X each independently represents a bistrialkylsilyl amide group; L represents a Lewis base; and w represents 0 to 3.

12. The method of manufacturing the copolymer according to claim 11, wherein the organic metal compound as the component (C) is an organic aluminum compound represented by the following general formula (I):

$$AlR^1R^2R^3 \qquad (I),$$

where $R^1$ and $R^2$ are the same or different hydrocarbon groups each having 1 to 10 carbon atoms or a hydrogen atom, and $R^3$ is a hydrocarbon group having 1 to 10 carbon atoms, in which $R^3$ may be the same as or different from $R^1$ or $R^2$ above.

13. The method of manufacturing the copolymer according to claim 11, wherein the olefin other than the conjugated diene compound is a non-conjugated olefin.

14. The method of manufacturing the copolymer according to claim 13, wherein the olefin other than the conjugated diene compound has 2 to 8 carbon atoms.

15. The method of manufacturing the copolymer according to claim 14, wherein the olefin other than the conjugated diene compound is at least one selected from the group consisting of ethylene, propylene, butene, pentene, hexene, heptene, and octene.

16. The method of manufacturing the copolymer according to claim 11, wherein the olefin other than the conjugated diene compound is an acyclic olefin.

17. The method of manufacturing the copolymer according to claim 11, wherein the olefin other than the conjugated diene compound is an α-olefin.

18. The method of manufacturing the copolymer according to claim 11, wherein the conjugated diene compound has 4 to 8 carbon atoms.

19. The method of manufacturing the copolymer according to claim 18, wherein the conjugated diene compound is 1,3-butadiene or isoprene.

* * * * *